(12) United States Patent
Thron et al.

(10) Patent No.: US 7,006,439 B2
(45) Date of Patent: Feb. 28, 2006

(54) METHOD AND APPARATUS FOR DETERMINING AN UPPER DATA RATE FOR A VARIABLE DATA RATE SIGNAL

(75) Inventors: Chris Thron, Austin, TX (US); Dipesh Koirala, Austin, TX (US); Dana Taipale, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 500 days.

(21) Appl. No.: 10/131,662

(22) Filed: Apr. 24, 2002

(65) Prior Publication Data

US 2003/0202499 A1    Oct. 30, 2003

(51) Int. Cl.
*H04L 12/26* (2006.01)

(52) U.S. Cl. ............... 370/232; 370/252; 370/335; 370/342; 375/225

(58) Field of Classification Search ........ 370/232–233, 370/252, 328, 335, 342; 375/225, 326; 714/789
See application file for complete search history.

(56) References Cited

U.S. PATENT DOCUMENTS

| | | | | |
|---|---|---|---|---|
| 5,566,206 A | * | 10/1996 | Butler et al. | 375/225 |
| 5,796,757 A | * | 8/1998 | Czaja | 714/789 |
| 6,175,590 B1 | * | 1/2001 | Stein | 375/225 |
| 6,690,652 B1 | * | 2/2004 | Sadri | 370/252 |
| 6,707,862 B1 | * | 3/2004 | Larsson | 375/326 |
| 6,792,041 B1 | * | 9/2004 | Kim et al. | 375/225 |
| 2001/0019541 A1 | | 9/2001 | Jou et al. | 370/311 |
| 2002/0003834 A1 | | 1/2002 | Yoshimura | 375/147 |

FOREIGN PATENT DOCUMENTS

| | | |
|---|---|---|
| EP | 0 817 440 A2 | 6/1997 |
| WO | WO 01/50615 A2 | 7/2001 |
| WO | WO 01/65715 A2 | 9/2001 |

OTHER PUBLICATIONS

Insoo Sohn and Seoyoung Lee, "Blind Rate Detection Algorithm in WCDMA Mobile Recevier", 0-7803-7005-8/01 2000 IEEE, pp. 1589-1592.

G. Yang and S. Kallel, "Joint Blind Rate Detection and Data Recording Scheme For CDMA Mobile Stations In Frequency Selective Rayleigh Fading Channels", 0-7803-5893-7/00 2000 IEEE, pp. 449-453.

Jachong Kim and Junjin Kong, "A New Blind Rate Decision Algorithm", IEEE Catalogue No. 01CH37239 0-7803-7101-1/01 2001 IEEE, pp. 114-116.

(Continued)

*Primary Examiner*—Dang Ton
*Assistant Examiner*—Melanie Jagannathan
(74) *Attorney, Agent, or Firm*—Law Office of Charles W. Bethards, LLP; Charles W. Bethards

(57) ABSTRACT

An integrated circuit arranged and constructed to determine an upper data rate for a variable data rate signal and method thereof includes a buffer, comparator, and combiner that are operable to compare a characteristic, such as an energy statistic of a number of partial symbols constructed from the variable data rate signal to a first threshold that corresponds to the number to provide a first comparison; process the variable data rate signal at a first data rate when the first comparison is favorable; compare the characteristic to a second threshold that corresponds to the number to provide a second comparison; and combine the partial symbols to provide other partial symbols at a second data rate that is less than the first data rate when the second comparison is favorable.

30 Claims, 5 Drawing Sheets

OTHER PUBLICATIONS

Lih-feng, Tsaur, Daniel C. Lee, Symbol Rate Adapation And Blind Rate Detection Using FOSSIL (Forest For OVSF-Sequence-Set-Inducing Lineages), 0-7803-7097-1/01 2001 IEEE, pp. 1754-1759.

Y. Okumura and F. Adachi, "Variable Rate Data Transmission With Blind Rate Detection For Coherent DS-CDMA Mobile Radio", Electronics Letters Sep. 26, 1996 vol. 32, No. 20, pp. 1865-1866.

Y. Okumura and F. Adachi, "Variable Rate Transmission And Blind Rate Detection For Coherent DS-CDMA Mobile Radio", Electronics Letters Nov. 20, 1997 vol. 24, No. 24, pp. 2026-2027.

Ingolf Held and Albert Chen, "Reduced Complexity Blind Rate Detection For Second And Third Generation Cellular CDMA Systems", Global Telecommunications Conference—Globecom '99, 0-7803-5796-5/99 199 IEEE, pp. 110-116.

Abhay Sharma, Urbashi Mitra, "Blind Rate Detection for Multirate UMTS DS-CDMA Signals", 0-7803-7097-1/01 2001 IEEE, pp. 2504-2509.

Hyuck M. Kwon, Sirote Ratanamahatana, and Jae H. Shim, "One Viterbi Decoder With Data Rate Estimation for IS-95 CDMA Wireless Communications"; 1997 IEEE, pp. 594-598.

* cited by examiner

METHOD AND APPARATUS FOR DETERMINING AN UPPER DATA RATE FOR A VARIABLE DATA RATE SIGNAL

FIELD OF THE INVENTION

This invention relates in general to communication systems, and more specifically to a method and apparatus for determining data rates for variable data rate signals within such systems.

BACKGROUND OF THE INVENTION

Communications systems and particularly wireless communications systems have become relatively more complex and have greater system capacities and higher operating frequencies. There are many more variations in such systems and more adaptations of those systems to provide service to differing user groups. Many of these systems now use communications protocols having variable data rates. For example Code Division Multiple Access (CDMA) systems such as IS-95 or CDMA 2000 uses variable data rate signals to account for such observations as that most people do not talk while they are listening. Thus the transmit data rate can be reduced when the user is listening thereby lowering potential interference for other users and increasing system capacity.

Systems that are now being discussed and deployed such as GPRS, 2.5G and 3G systems are often packet switched rather than circuit switched and most include provisions for variable data rates. These variable data rates allow large data transfers in reasonable time periods when required and when the channel conditions allow. Typically in CDMA systems variable data rates are accommodated by employing different spreading factors. Basically this can be viewed as how many channel symbols or chips a given information symbol is spread over. For example in one CDMA system commonly referred to as wideband CDMA or WCDMA the channel symbol or chip rate is 3.84 million chips per second (Mcps) and spreading factors from 4 to 256 can be used thus enabling data rates or data symbol rates from 960 Kilo symbols per second (Ksps) down to 15 Ksps depending on bandwidth required and channel conditions.

Often the receiving unit for these variable data rate signals does not know the data rate or spreading factor that is being used and must therefore make a blind rate determination before a signal may be properly decoded, etc. This is further complicated where as in one proposed WCDMA system this data rate can be changed with every data frame which has been defined as 10 milliseconds in duration or 38,400 chips. Many of these systems are also taking advantage of more complex antenna structures thus taking advantage of transmitting and thus receiving a signal over multiple paths. The net of all of this is huge quantities of data that must be transported and processed and this is exacerbated in an uplink receiver such as at a base receiver where the receiver may be simultaneously receiving several tens of users. Needless to say this quantity of data and the resultant bandwidth problems can be dramatically reduced by reducing the data at the chip rate to data at an information symbol rate Various techniques have been used for this blind data rate determination. One basically compares the power for all symbols on a control channel with the power on the data channel. This technique while simple is not accurate except in the case of determining that no signal is present. Another approach is to receive a string of data that is sufficiently large to include a CRC error check code and attempt look for a correct CRC considering each possible spreading factor. While this may work reasonably well given a reasonably stable channel large amounts of data must be buffered and complex computations must be repetitively undertaken until, if ever, a correct CRC is found. Another approach amounts to performing an autocorrelation with each possible symbol stream for each possible spreading factor and choosing the spreading factor that results in the largest autocorrelation over some number of symbols at the highest spreading factor. While it is claimed that this process works it still requires significant amounts of data and a large number of complex calculations before a comparison of each possible spreading factor based signal can be undertaken.

What is needed is a method and apparatus that can efficiently determine a data rate for a variable data rate signal in an expeditious fashion without incurring the problems observed with the prior art.

SUMMARY OF THE INVENTION

The present invention provides a novel and dramatically improved method of determining an upper data rate for a variable data rate signal. Advantageously the principles and concepts according to the invention can be implemented prior to frame decoding and may be applied without waiting for a complete frame of data. In one aspect according to the invention, a method of determining an upper data rate for a variable data rate signal is defined. The method includes comparing a characteristic of a first number of first partial symbols constructed from the variable data rate signal to a first threshold to provide a first comparison. The first threshold corresponds to the first number where the first number is less than all first partial symbols in a frame. The method further includes processing the variable data rate signal at a first data rate when the first comparison is favorable. Also included is a process of comparing the characteristic noted above to a second threshold to provide a second comparison, where the second threshold likewise corresponds to the first number; and then combining the first partial symbols to provide second partial symbols at a second data rate that is less than the first data rate when the second comparison is favorable.

Another aspect includes an integrated circuit arranged and constructed to determine an upper data rate for a variable data rate signal, where the integrated circuit comprises a buffer, a comparator, and a combiner operating collectively configured to perform a method analogous to the one above. Additional aspects with similar functionality include a receiver and software program.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF PREFERRED EMBODIMENT

Figure 1:
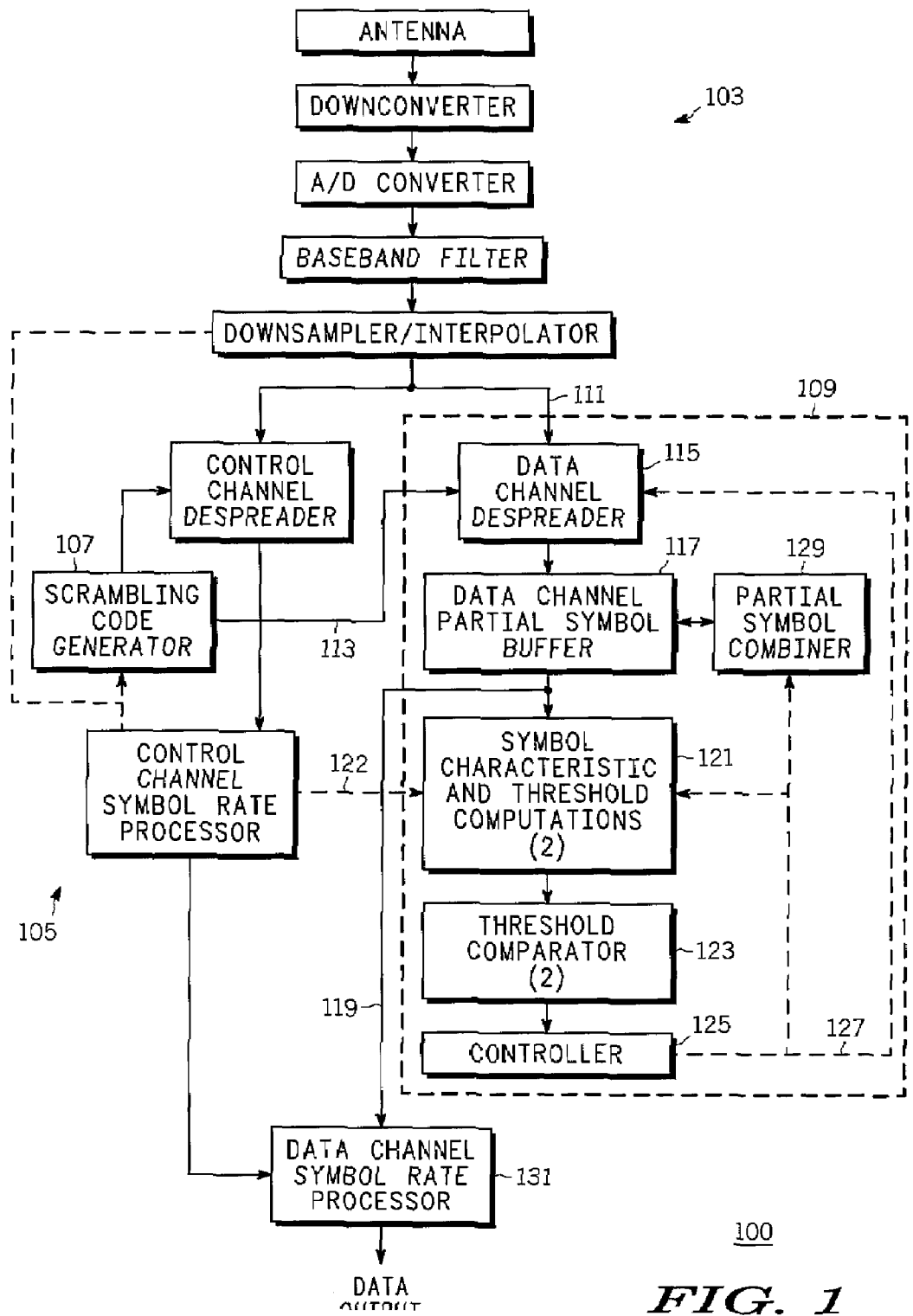
FIG. 1 depicts a block diagram of a preferred embodiment of a receiver in accordance with the present invention.

In overview form the present disclosure concerns communications systems that utilize receivers to provide service for communications units or more specifically user thereof operating therein. More particularly various inventive concepts and principles embodied as methods and apparatus for quickly and efficiently identifying a data rate or making a blind data rate determination for a variable data rate signal are discussed and disclosed. The communications systems of particular interest are those being deployed and developed such as GSM, GPRS, EDGE, TETRA, iDEN, CDMA, W-CDMA, CDMA2000, 2.5G, or 3G systems that use modulation formats such as QPSK, DQPSK, OQPSK, BPSK, QAM, and spread spectrum or variations and evolutions thereof that make use of or will make use of variable data rate signals in order to provide high data capacities to users.

As further discussed below various inventive principles and combinations thereof are advantageously employed to facilitate an upper data rate determination for a variable data rate signal having an unknown actual data rate. The determination is accomplished quickly, accurately and efficiently without an undue burden on processing or data queuing facilities thus alleviating various problems associated with known systems and techniques while still facilitating cost effective and high performance data rate determination provided these principles, concepts, or equivalents thereof are utilized.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions. Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore further discussion of such software and ICs, if any, will be limited to the essentials with respect to the principles and concepts of the preferred embodiments, in the interest of brevity and minimization of any risk of obscuring the principles and concepts in accordance with the present invention.

Referring to FIG. 1 a simplified functional block diagram of a receiver modified according to the principles and concepts herein is depicted and will now be described. FIG. 1 shows a known CDMA receiver functional block diagram that has been modified according to certain inventive principles and concepts as further discussed below. While a CDMA and especially WCDMA or UMTS receiver may find the present principles and concepts particularly advantageous, given the copious amount of data to be processed and huge reductions in this mass of data that are possible once a proper data rate has been determined, these principles will also be advantageous to other receivers that must make a blind data rate determination. Further discussions will be limited to the preferred CDMA embodiment of a receiver.

The FIG. 1 receiver 100 is arranged and constructed to determine an upper data rate for a variable data rate signal. The receiver, in overview form, includes a front end 103 that is basically known and includes, inter-coupled as depicted, an antenna system with one or more elements for absorbing radio frequency signals, a down converter that mixes or converts the radio frequency signals to a base band signal, an A/D converter that converts this signal to a digital signal, a base band filter that filters the digital signal to reject as much channel induced noise as possible and provide proper power spectral density for the base band signal, and a downsampler and interpolator that reduces the sampling rate from the A/D converter and time aligns or interpolates the samples according to a feed back signal from a receiver control section 105 to provide a base band signal with an unknown data rate. The receiver control section 105 is known and includes, inter-coupled as depicted, a control channel despreader that correlates the base band signal with a PN sequence corresponding to a predetermined CDMA control channel and provided by the scrambling code generator 107 to provide control channel symbols to a control channel symbol processor that provides the feedback signal mentioned above.

The base band signal is also applied to a data rate processor 109 at input 111. In sum this processor constructs a small number of partial symbols at a highest data rate, calculates a characteristic and various thresholds from this small number and based on a comparison of the characteristic and thresholds either confirms or excludes the highest data rate and in the latter event combines the partial symbols to the next longer symbols and repeats this process for sequentially lesser data rates until a data rate is confirmed. The balance of these discussions will be devoted to the details and underlying inventive principles and concepts thereof. The base band signal at input 111 is despread or correlated with a PN sequence provided by the scrambling code generator 107 at input 113 at a data channel despreader 115. This PN sequence at input 113 corresponds to a signal from a known user and the result is a despread or correlated symbol sequence at the chip rate.

Figure 2:
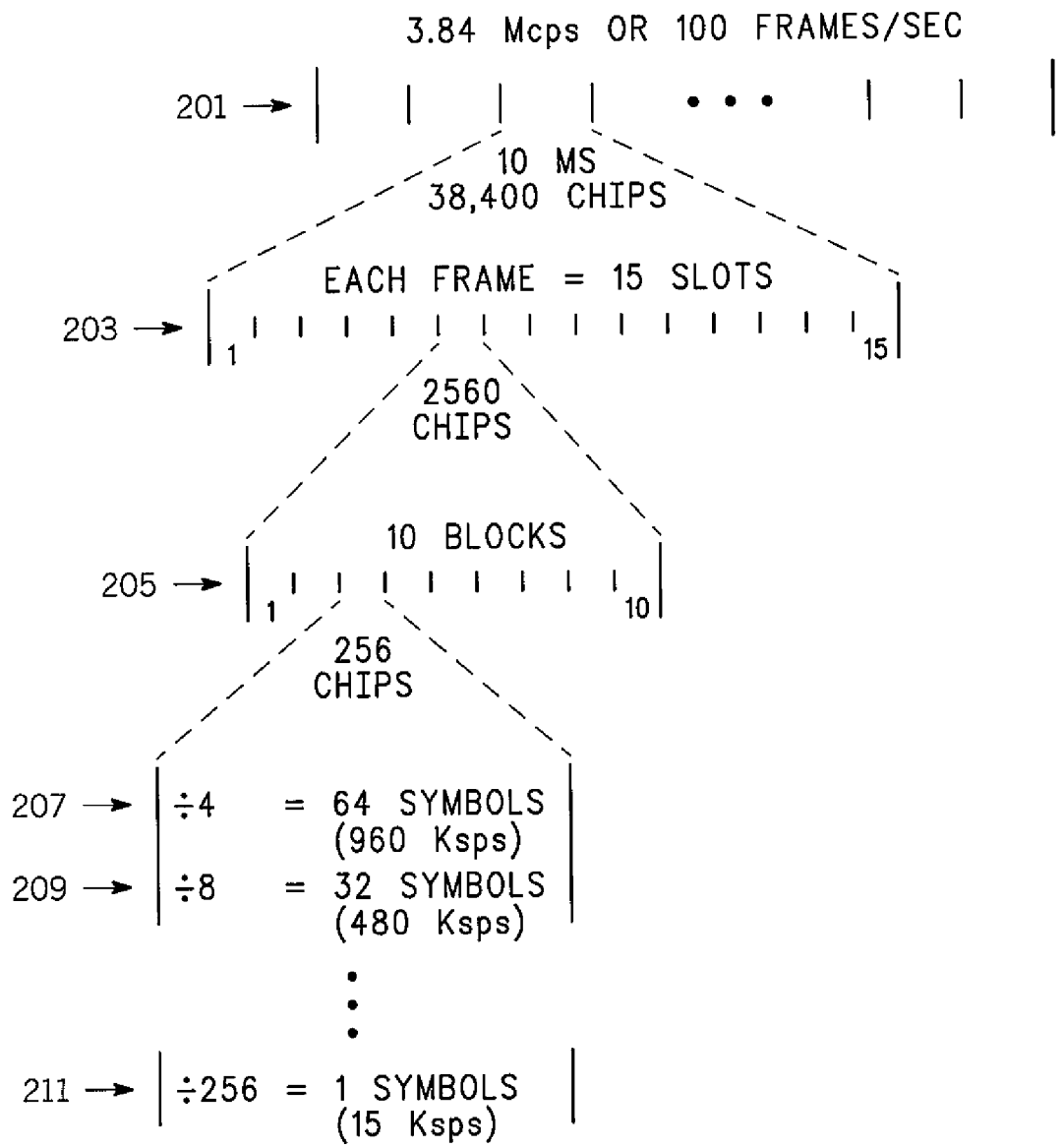
FIG. 2 illustrates a data structure diagram of an exemplary variable data rate signal that the receiver of FIG. 1 may be used to receive.

Referring now to FIG. 2 a description of this chip rate signal will be provided to insure that common terminology is available for the balance of our discussions. A WCDMA base band signal is a 3.84 million chips per second (Mcps) signal that is conventionally organized into 100 frames per second, each 10 milli-seconds in length and including 38,400 chips as depicted at 201. As earlier noted when this is a variable data rate signal the data symbol rate can vary from 960 thousand symbols per second (Ksps) down to 15 Ksps depending on the spreading factor or how many chips a given data symbol is spread over. As shown at 203 each frame is further divided into 15 slots or power control groups (PCGs), each slot including 2560 chips. For the present purposes these slots are further parsed into 10 blocks with each block including 256 chips as shown at 205. With a spreading factor of 4 this is equivalent to 64 data symbols corresponding to a data rate of 960 KSPS as depicted at 207. At 209 a spreading factor of 8 indicates that 32 data symbols corresponding to a data rate of 480 Ksps are in each block and so on up to a spreading factor of 256 with one data symbol corresponding to a data rate of 15 Ksps, shown at 211.

Returning to FIG. 1 the data channel despreader 115, in practice, typically includes a symbol combiner that combines the despread symbols according to the lowest or smallest possible spreading factor (4 for WCDMA system) or as directed by a feedback signal. As a brief overview the output of the correlator will be symbols including an I and Q component at the chip rate (3.84 Mcps for WCDMA) and these symbols will be combined or algebraically added with 4 adjacent symbols combined by the symbol combiner and these despread and combined, at spreading factor 4, partial symbols will be coupled to the partial symbol buffer 117. These are referred to as partial symbols because the actual data rate and spreading factor associated with the variable data rate signal has not yet been determined. In any event the buffer queues or stores a first number of first partial symbols constructed from the variable data rate signal. Note that the output 119 of data rate processor 109 goes to a data channel symbol processor 131. Typically this symbol processor 131 is implemented in a DSP would be forced to process each base band signal at the maximum possible data rate. When the receiver is receiving an uplink signal where a multitude of users may be present the input data rates to the DSP can be overwhelming. Thus one of the tasks or desired results of the data rate processor and methods thereof is a significant reduction in data rates. In view of the fact that the expected data rate for a user is much smaller than the highest data rate this will be possible given the inventive principles and concepts herein discussed and disclosed.

The output of the buffer is also coupled to a calculator 121, along with noise and symbol power information from the control channel symbol rate processor at input 122, where a symbol characteristic and a first and second threshold, each corresponding to a first number of first partial symbols, such as the number of symbols in a block from FIG. 2, are computed and these are coupled to a comparator 123. The comparator is for first comparing the characteristic of the first number of the first partial symbols to the first threshold to provide a first comparison and the comparator further for second comparing the characteristic of the first number of the first partial symbols to the second threshold to provide a second comparison. When the first comparison is favorable, preferably indicating that the first data rate is present, the buffer provides the first partial symbols as symbols for further processing the variable data rate signal at a first data rate to the processor 131 and when the second comparison is favorable, preferably excluding the first data rate as a possibility, a combiner or partial symbol combiner 129 combines the first partial symbols to provide second partial symbols at a second data rate that is less than the first data rate. Although not always the case for a CDMA signal such as that shown in FIG. 2 this combining step is rather straightforward as adjacent symbols with I and Q components resulting from a spreading factor of 4 are algebraically combined or added to provide I and Q components of symbols with a spreading factor of 8 and so on for further combinatorial steps. Note that the comparator 121 is coupled to controller 125 that controls the calculator, the combiner, the buffer, and the despreader such that the receiver determines the upper data rate. Note also that the first and second comparison may be inconclusive meaning that neither are favorable in which case the despreader and buffer operate to increase the first number to a second number of the first partial symbols, such as by including another block of partial symbols, and the calculator, the comparator, and the combiner repeat the computing, the first comparing, the second comparing, the providing, and the combining operations, preferably under the control of the controller 125. Furthermore and not withstanding the process or flow depicted where the output 119 comes from the buffer 117 it may be more appropriate to couple the output from the despreader 115 directly to the data symbol rate processor 131 once a data rate has been determined. The controller 125 via the control signal 127 would control this procedure. Also recall that the data rate will need to be determined once for each frame or every 10 ms for a WCDMA signal.

One aspect or embodiment according to the present invention is a software program that when installed and operating on or being executed by a programmable integrated circuit will result in the integrated circuit facilitating determination of an upper data rate for a variable data rate signal. In sum much or all of the above discussed functionality as well as the more detailed functionality discussed herein below can be advantageously undertaken by a target machine or processor executing the software instructions that have been designed and written according to the targeted machine executing the software program. The design and drafting details of the software program will be well within the capabilities of one of ordinary skill, given the discussions and disclosure herein. For example, the software program would include instructions that when executed perform or cause the target machine or processor to perform a method that includes first comparing a characteristic of a first number of first partial symbols constructed from the variable data rate signal to a first threshold to provide a first comparison, where the first threshold corresponds to the first number. Next processing the variable data rate signal at a first data rate, when the first comparison is favorable thereby confirming the presence of a signal with a data rate and symbols corresponding to the first partial symbols, will be undertaken or performed.

If not favorable then a process of second comparing the characteristic of the first number of the first partial symbols to a second threshold to provide a second comparison, where the second threshold also corresponds to the first number is performed. When the second comparison is favorable thereby excluding the presence of a first data rate, the process combines the first partial symbols to provide second partial symbols at a second data rate that is less than the first data rate. When neither comparison is favorable the program includes instructions to increase the number of partial symbols used to calculate the characteristic and thresholds to a second number of partial symbols and the steps of first comparing, processing, second comparing, and combining are repeated until a data rate for the variable data rate signal has been determined.

The data rate processor may be advantageously implemented in integrated circuit form. This may be one or more integrated circuits and one of ordinary skill will be able to make many design choices given the principles and concepts disclosed here. One preferred form has the despreader 115 and its included symbol combiner along with the partial symbol buffer 117 implemented in a custom or semi-custom integrated circuit such as an application specific integrated circuit or field programmable logic array with the balance of the data rate processor 109 functions implemented in a programmable integrated circuit such as a DSP or other small processor. In one form these functions are implemented by a DSP that also handles the data channel symbol rate processor 131 duties.

The integrated circuit aspect of the data rate processor will now be reviewed. Some of this discussion will be somewhat duplicative of the comments above. The integrated circuit is arranged and constructed to determine an upper data rate for a variable data rate signal, such as may be found in a CDMA signal such as WCDMA or UMTS or the like. The integrated circuit includes a buffer 117 for queuing a first number of first partial symbols, corresponding to a first data rate that is preferably the highest possible data rate for the variable data rate signal, constructed from the variable data rate signal; a comparator 123 for first comparing a characteristic of the first number of the first partial symbols to a first threshold to provide a first comparison, where the first threshold corresponds to the first number, the comparator further for second comparing the characteristic of the first number of the first partial symbols to a second threshold to provide a second comparison, where the second threshold corresponds to the first number; wherein the buffer provides the first partial symbols as symbols for further processing the variable data rate signal at a first data rate when the first comparison is favorable; and a combiner 129 is arranged for combining the first partial symbols to provide second partial symbols at a second data rate that is less than, preferably half, the first data rate when the second comparison is favorable.

Preferably, the integrated circuit further includes a calculator 121 or processor that is coupled to the buffer and the comparator, for computing the characteristic and the first threshold and the second threshold as well as a controller 125 coupled to the comparator for controlling the calculator, the combiner, the buffer, and a despreader, also preferably included with the integrated circuit, such that the integrated circuit determines the upper data rate. Preferably, the despreader 115 and the buffer 117 as controlled by the controller 125 via a feedback signal at 127, when the first comparison and the second comparison are not favorable, operate to increase the first number to a second number of the first partial symbols and the calculator, the comparator, and the combiner repeat the computing, the first comparing and second comparing, the providing, and the combining operations one or more times until a data rate is determined for the variable data rate signal. The integrated circuit, when the second comparison is favorable, repeats these operations under control of the controller.

Specifically the calculator computes a characteristic of a second number of the second partial symbols constructed from the variable data rate signal and a third threshold and a fourth threshold, each corresponding to the second number; the comparator compares the characteristic to the third threshold to provide a third comparison and further compares the characteristic of the second number of the second partial symbols to the fourth threshold to provide a fourth comparison; wherein the buffer or despreader directly provides the second partial symbols as symbols for further processing the variable data rate signal at the second data rate when the third comparison is favorable; and the combiner combines the second partial symbols to provide third partial symbols at a third data rate that is less than the second data rate when the fourth comparison is favorable.

The integrated circuit, specifically comparator preferably compares a characteristic or statistic that is either proportional to an energy of or a sum of squared linear combinations of, such as differences between adjacent pairs, the first number of the first partial symbols or a characteristic or statistic that corresponds to channel condition estimates to the respective first and second thresholds. Each of these three alternative characteristics or statistics and corresponding thresholds will be further discussed and developed herein below. The integrated circuit, specifically, the comparator compares the characteristic to a first threshold that confirms that the variable data rate signal includes the first data rate to a predetermined confidence level when the comparison is favorable. Preferably this first threshold corresponds to an expected mean for the first number of first partial symbols plus a predetermined number of standard deviations when the variable data rate signal does not include the first data rate so that when the characteristic exceeds this threshold the first comparison is favorable implying that the first date rate is present with a confidence level corresponding to the predetermined number of variances, such as 3.7 standard deviations for a 99.99% confidence level given a Gaussian distribution.

The integrated circuit or comparator compares the characteristic or statistic to a second threshold that confirms that the variable data rate signal does not include the first data rate to a predetermined confidence level or excludes the first data rate to the confidence level. Preferably the second threshold corresponds to an expected mean for the first number of first partial symbols less a predetermined number of standard variations when the variable data rate signal includes the first data rate so that when the characteristic is less than the threshold the second comparison is favorable implying the first date rate is not present with a confidence level corresponding to the predetermined number of variances, such as 3.7 standard deviations for a 99.99% confidence given a Gaussian distribution.

Some time will now be devoted to a discussion of the underlying concepts for determining one or more characteristics or statistics and respective thresholds. Most of this discussion will consider a CDMA signal but the underlying concepts will be similar for other forms of signals. The signal, specifically a WCDMA signal with multi-paths for each user as received at the receiver, within for example a base station or subscriber unit can be represented as a series of complex "chips" $C_1, C_2, \ldots$ where each $C_n$ is a complex number with real and imaginary parts. Demodulating these chips for each individual multipath of each individual user first involves the "dispreading" of chips into symbols (this is a representation of the output of the despreader 115):

$$Z_1 = C_1 \cdot L_1 + \ldots + C_{SF} \cdot L_{SF};$$

$$Z_2 = C_{SF+1} \cdot L_{SF+1} + \ldots + C_{2\ SF} \cdot L_{2\ SF};$$

$$\ldots$$

$$Z_K = C_{(K-1)SF+1} \cdot L_{(K-1)SF+1} + \ldots + C_{K\ SF} \cdot L_{K\ SF};$$

Here the $L_k$ represent chips of the "scrambling code" which is provided by generator 107. As is known each multipath for each user in a CDMA system has its own associated scrambling code—hence, each multipath has its own associated symbol stream. The number SF is known as the "spreading factor", and as presently proposed is a power of 2: $SF \equiv 2^s$, $s = 2, 3, \ldots, 8$ Let us focus now on one of these symbol streams. The received, combined symbols despread up to $2^s$ chips are $$Z_k = \zeta_k \cdot S_k + n_k, \quad k = 1 \ldots K,$$

Where:
 $\zeta_k$ is the transmitted source bit (+1 or −1) corresponding to the chips $\{C_{(K-1)SF+1} \ldots C_{K\ SF}\}$;
 $S_k$ is the complex channel (determined by propagation conditions); and
 $n_k$ is complex noise (including interference from other users).

We presume that the noises $n_k$ are independent complex Gaussian-distributed variables with total variance $\sigma^2$, (real & imaginary parts both have variance $\sigma^2/2$). We further assume, based on maintaining a proper link margin, that the target Signal to Noise Ratio (SNR) for the user is D dB, corresponding to a nominal symbol power P where $P \equiv 10^{0.1D}$. In the following, we shall use the fact that if the signal is despread to SF/2 instead of SF, then the nominal power is P/2.

Now we will investigate the use and development of a statistic and thresholds for an energy based characteristic that we will refer to as an energy detection (ED) characteristic or statistic. We first investigate the use of the energy detection statistic $$X = \Sigma_{k=1,\ldots,K} |Z_k|^2$$

The statistic X may be approximated as a Gaussian, since it is a sum of K individual independently distributed random variables (iir r. v.'s), where K, the number of partial symbols from the above discussion, is a large number. The mean and variance of X may be computed as follows. For a received symbol Z (for brevity we drop the subscript k), we have $|Z|^2 = |\zeta \cdot S + n|^2 = |S|^2 + 2 \cdot \text{Re}\{\zeta \cdot S^* n\} + |n|^2$ It follows that the expected value of $|Z|^2$ is given by $E[|Z|^2] = |S|^2 + \sigma^2$. Now we may compute from properties of the complex Gaussian random variable n: $\text{Var}[|n|^2] = \sigma^4$ and $\text{Var}[2 \cdot \text{Re}\{\zeta \cdot S^* n\}] = 4 \cdot |S|^2 \cdot \sigma^2/2 = 2 \cdot |S|^2 \cdot \sigma^2$. Therefore $\text{Var}[|Z|^2] = \sigma^2 \cdot (\sigma^2 + 2|S|^2)$. Thus if a signal with SNR equal to D dB is present, then X is Gaussian (sum of iid r.v.'s) with mean equal to $K \cdot \sigma^2 \cdot (P+1)$ and variance equal to $K \cdot 2\sigma^4 \cdot (2P+1)$, where $P \equiv 10^{0.1D}$.

If we want to rule out the possibility of a signal present with confidence $1-\alpha$ (where $\alpha$ is a small number, say $10^{-4}$), then we set a threshold equal to the expected mean if the signal is present minus a number of standard deviations given the signal is present, the number corresponding to the desired level of confidence:

$K \cdot \sigma^2 \cdot (P+1) - N_\alpha \cdot \text{sqrt}(K \cdot \sigma^4 \cdot (2P+1))$ where $N_\alpha$ is the number of standard deviations associated with a (one-sided) confidence of $1-\alpha$. If the statistic goes under this threshold, then we reject the possibility of a signal present with confidence $1-\alpha$.

So far we have talked about ruling out the presence of the signal. Suppose that instead we want to confirm the presence of a signal at spreading factor $2^s$, which is equivalent to ruling out the alternative. In this case, the worst-case alternative is the presence of a signal at the next larger spreading factor $(2^{s+1})$. Suppose the worst-case (largest possible) SNR at the next larger spreading factor is D' dB, corresponding to a nominal power of $P' \cdot 2\sigma^2$ where $P' \equiv 10^{0.1D'}$ (Note that in the case where the spreading factor $2^s = 256$, we have $P' = 0$). The corresponding power at spreading factor $2^s$ is $P' \cdot \sigma^2/2$. If we want to rule out the possibility of no signal present at $SF = 2^s$ with confidence $1-\alpha$ (where $\alpha$ is a small number, say $10^{-4}$), then we set a threshold:

$K \cdot \sigma^2 \cdot (P'/2+1) + N_\alpha \cdot \text{sqrt}(K \cdot \sigma^4 \cdot (P'+1))$ where $N_\alpha$ is the number of standard deviations associated with a (one-sided) confidence of $1-\alpha$. If the statistic exceeds this threshold, then we reject the possibility that the spreading factor is greater than $2^s$ (or that no signal is present) with confidence $1-\alpha$.

Here we give an illustrative example. With SF=256 and signal power=3 dB (corresponding to P=2), K=150 (which corresponds to one frame of symbols at SF=256), $N_\alpha = 3.7$ (corresponding to $\alpha = 1e-4$), $\sigma^2 = 1$, we have (using P'=0)
Signal absent upper-bound: $150 + 3.7 \cdot \text{sqrt}(150) = 195.3$
SF 256 signal present lower-bound: $450 - 3.7 \cdot \text{sqrt}(750) = 349$ Since 195.3<349, we can always be assured of determining presence/absence of a signal of SF 256 within a single frame, with confidence of at least 0.9999.

Now let us see if the algorithm can rule out SF 128 at 3 dB with confidence 0.9999.

Testing at SF 128, we have K=300, $N_\alpha = 3.7$, $\sigma^2 = 1$, and the two thresholds are
SF 256 signal present upper-bound: $600 + 3.7 \cdot \text{sqrt}(300 \cdot 3) = 711$
SF 128 signal present lower-bound: $900 - 3.7 \cdot \text{sqrt}(300 \cdot 5) = 757$ Since 711<757, it is possible to rule out SF 128 at confidence 0.9999. In this case, then, the actual spreading factor may be found with confidence 09999.

Suppose instead of a single path we have M multipaths, and take as a decision statistic or characteristic: $X' \equiv \Sigma_{m=1,\ldots,M} \Sigma_{k=1,\ldots,K} |Z_{mk}|^2$, where $Z_{mk}$ is the k'th received symbol on the m'th multipath. Note there is no need to do Maximal Ratio Combining (MRC) combination of the symbols to obtain this statistic (so channel estimation is not required): Rather it is only necessary to add the ED statistic from all multipaths to get a detection signal, the decision statistic X'. Since expected values and variances add, we have as our thresholds $K \cdot \Sigma_{m=1\,M} \sigma_m^2 (P_m+1) - N_\alpha \cdot \text{sqrt}(K \cdot \Sigma_{m=1\,M} \sigma_m^4 (2P_m+1))$ to rule out the signal-present case (when the threshold exceeds X'), and $K \cdot \Sigma_{m=1\,M} \sigma_m^2 (P_m'/2+1) + N_\alpha \cdot \text{sqrt}(K \cdot \Sigma_{m=1\,M} \sigma_m^4 \cdot (P_m'+1))$ to rule out the signal not-present case (when X' exceeds the threshold). Assuming all $\sigma_m^2$ are equal, and using the fact that
$\Sigma_{m=1\,M} P_m = P \equiv$ nominal SNR for MRC signal, we have thresholds
$K \cdot \sigma^2 (P+M) - N_\alpha \cdot \text{sqrt}(K \cdot \sigma^4 (2P+M))$, to rule out the signal-present case, and
$K \cdot \sigma^2 (P'/2+M) + N_\alpha \cdot \text{sqrt}(K \cdot \sigma^4 (P'+M))$, to rule out the no-signal case, where $\sigma^2 \equiv$ noise variance per path; K=Number of symbols used in the estimation; M=Number of multipaths combined; $N_\alpha \equiv$ Number of standard deviations associated with a one-sided confidence of $1-\alpha$; P=Nominal SNR for MRC symbol.

P'$\equiv$Worst-case SNR for MRC symbol at next higher spreading factor (P'=P if SF<256, & P'=0 if SF=256)

Another way to decide between SF's $2^s$ and $2^{s+1}$ and the corresponding data rates is by using the following decision statistic $Y \equiv \Sigma_{k=1,\ldots,K/2} |Z_{2k} - Z_{2k-1}|^2 = \Sigma_{k=1,\ldots,K/2} |S \cdot (\zeta_{2k} - \zeta_{2k-1}) + (n_{2k} - n_{2k-1})|^2$ which is a squared linear combination of the partial symbols. If the actual SF is equal to $2^s$, it may be shown that Y has mean $\mu_1$ and variance $\sigma_1^2$ where $\mu_1 = K \cdot (P+1) \cdot \sigma^2$ and $\sigma_1^2 = K \cdot \sigma^4 \cdot (2 \cdot P^2 + 4 \cdot P + 2),$ where n' and n" in the above derivation denote standard complex Gaussian variables with mean 0 and variance $\sigma^2$.

On the other hand, if $SF \geq 2^{s+1}$ it follows that Y has mean $\mu_{1'}$ and variance $\sigma_{1'}^2$ where $\mu_{1'} = K \cdot \sigma^2$ $\sigma_{1'}^2 = 2 \cdot K \cdot \sigma^4$ In the case of M multipaths, by summing Y over M multipaths $$\mu_1 = K \cdot (P+M) \cdot \sigma^2 \text{ and } \sigma_1^2 = K \cdot \sigma^4 \cdot (2 \cdot P^2 + 4 \cdot P + 2M),$$

$\mu_{1'} = K \cdot M \cdot \sigma^2$, $\sigma_{1'}^2 = 2 \cdot K \cdot M \cdot \sigma^4$, where $\sigma^2 \equiv$ noise variance per path; K=Number of symbols used in the estimation; M=Number of multipaths combined; $N_\alpha$=Number of standard deviations associated with a one-sided confidence of $1-\alpha$; P=Nominal SNR for MRC (maximal ratio combined) symbol. Hence we have thresholds:

$\mu_{1'} + N_\alpha \cdot \sigma_{1'}$, to rule out the no-signal (or higher spreading-factor) case, and $\mu_1 - N_\alpha \cdot \sigma_1$, to rule out the signal-present case, In the above derived and discussed characteristics, the noise power $\sigma^2$ and signal power $P \cdot \sigma^2$ are required to set the decision thresholds. Hence the system must supply noise power and signal power estimates to the threshold control or calculator. Fortunately, in a CDMA receiver, signal and noise power estimates are already required for power control. These estimates may therefore be used in setting thresholds. Some margin in the thresholds may be required in order to account for uncertainties in the power estimates, for example a bias added or subtracted from signal power to accommodate or account for signal fading. The size of this margin may be determined empirically. Note further that the power estimates used for P and P' in the thresholds given above need not be identical. For example, by biasing P slightly low and P' slightly high, additional protection against wrong decisions resulting from inaccuracies in the power estimates can be provided.

The characteristics or statistics discussed above do not require signal parameter estimation. However, if signal parameter estimates are available, other statistics may be used, which hold promise of yielding superior performance (i.e. accurate SF and corresponding data rate determinations within a shorter period of time). One signal parameter that is estimated in CDMA receivers is the channel $S_k$. A channel estimate $\hat{S}_{mk}$ for each time k and each multipath m is necessary in order to demodulate the signal. If the channel estimate is available for use, then the following alternative statistics may be used for spreading factor determination:

$X'' \equiv \Sigma_{k=1,\ldots,K} |\Sigma_{m=1,\ldots,M} \text{Re}\{\hat{S}_{mk}^* \cdot Z_{mk}\}|$, which is a modification of the ED statistic, and $Y'' \equiv \Sigma_{k=1,\ldots,K/2} |\Sigma_{m=1,\ldots,M} \text{Re}\{\hat{S}_{m,2k}^* \cdot [Z_{m,2k} - Z_{m,2k-1}]\}|$, which is a modification of the SSD statistic.

In the case of perfect channel estimation for the modified ED statistic, we may compute (with signal present) $X'' = \Sigma_{k=1,\ldots,K} |\Sigma_{m=1,\ldots,M} \text{Re}\{S_{mk}^* \cdot (\zeta_k \cdot S_{mk} + n_{mk})\}| = \Sigma_{k=1,\ldots,K} |\Sigma_{m=1,\ldots,M} \zeta_k \cdot |S_{mk}|^2 + \text{Re}\{S_{mk}^* \cdot n_{mk}\}| = \Sigma_{k=1,\ldots,K} |S|^2 + |S| \cdot \text{Re}\{n_k'\}| = |S| \cdot \Sigma_{k=1,\ldots,K} |S| + n_k''/\sqrt{2}|$, where $n_k'(n_k'')$ are independent complex (real) Gaussian random variables with variance $\sigma^2$. It follows that X'' (with signal present) has mean and variance:

$\mu_2 = K \cdot \sigma^2 \cdot \text{sqrt}(P) \cdot M(2 \cdot P)/\sqrt{2}$ and $\sigma_2^2 = K \cdot \sigma^4 \cdot P \cdot V(2 \cdot P)/2$ where $$M(z) \equiv (2\pi)^{-1/2} \int_{-\infty}^{\infty} |\text{sqrt}(z) + x| \cdot \exp(-x^2/2) dx$$

$$V(z) \equiv (2\pi)^{-1/2} \int_{-\infty}^{\infty} |\text{sqrt}(z) + x|^2 \cdot \exp(-x^2/2) dx - M(z)^2$$

When a signal at the current SF is absent, we may compute, in the worst case, $X'' = \text{sqrt}(\sigma^2 \cdot P) \cdot \Sigma_{k=1,\ldots,K} \{\text{sqrt}(\sigma^2 \cdot P'/2) + n_k''/\sqrt{2}\}$, with a corresponding mean and variance of $\mu_{2'} = K \cdot \sigma^2 \cdot \text{sqrt}(P) \cdot M(P')$ and $\sigma_{2'}^2 = K \cdot \sigma^4 \cdot P \cdot V'(P')$. The thresholds for the statistic X'' are then $\mu_2 - N_\alpha \cdot \sigma_2$, to rule out the signal-present case, and $\mu_{2'} + N_\alpha \cdot \sigma_{2'}$, to rule out the no signal present (or higher spreading factor) case.

In the case of perfect channel estimation for the modified SSD, with signal present we may compute $$Y'' \equiv \Sigma_{k=1,\ldots,K/2} |\Sigma_{m=1,\ldots,M} \text{Re}\{S_{m2k}^* \cdot [(\zeta_{2k} - \zeta_{2k-1}) \cdot S_{m2k} + (n_{m2k} - n_{m2k-1})]\}|,$$

$$= \Sigma_{k=1,\ldots,K/2} |\Sigma_{m=1,\ldots,M} (\zeta_{2k} - \zeta_{2k-1}) \cdot |S_{m,2k}|^2 + \sqrt{2} \cdot \text{Re}\{S_{mk}^* \cdot n_{mk}'\}|$$

$$= \Sigma_{k=1,\ldots,K/2} |(\zeta_{2k} - \zeta_{2k-1}) \cdot |S|^2 + \sqrt{2} \cdot |S| \cdot \text{Re}\{n_k'\}|$$

$$= |S| \cdot \Sigma_{k=1,\ldots,K/2} |v_k |S| + n_k''|$$

where $n_k'(n_k'')$ are independent complex (real) Gaussian random variables with variance $\sigma^2$, and $v_k \equiv (\zeta_{2k} - \zeta_{2k-1})$. It follows that Y'' has mean $\mu_3$ and variance $\sigma_3^2$ where $$\mu_3 = K \cdot \sigma^2 \cdot \text{sqrt}(P) \cdot (0.25 \cdot M(4 \cdot P) + 0.2)$$

$$\sigma_3^2 = K \cdot \sigma^4 \cdot P \cdot \{0.25 \cdot V(4 \cdot P) = 0.091 + 0.5 \cdot (0.5 \cdot M(4 \cdot P) = 0.2\}^2\}.$$

With signal absent, we have $Y'' = |S| \cdot \Sigma_{k=1,\ldots,K/2} |n_k''|$, with mean and variance $\mu_{3'} = 0.4 \cdot K \cdot \sigma^2 \cdot \text{sqrt}(P)$ and $\sigma_{3'}^2 = 0.182 \cdot K \cdot \sigma^4 \cdot P$. Hence we have thresholds $\mu_3 - N_\alpha \cdot \sigma_3$ to rule out the signal-present case, and $\mu_{3'} + N_\alpha \cdot \sigma_{3'}$, to rule out the no signal present (or higher spreading factor) case.

One potential downside in using channel estimate-based statistics is the observation that in many CDMA systems, the computation of the channel estimate involves a significant time delay (one or two slots). This delay would incur a corresponding delay in the computation of the statistic, which means that the spreading factor determination would be similarly delayed. For this reason, it may be advantageous to use one of the other two approaches outlined above.

Figure 3:
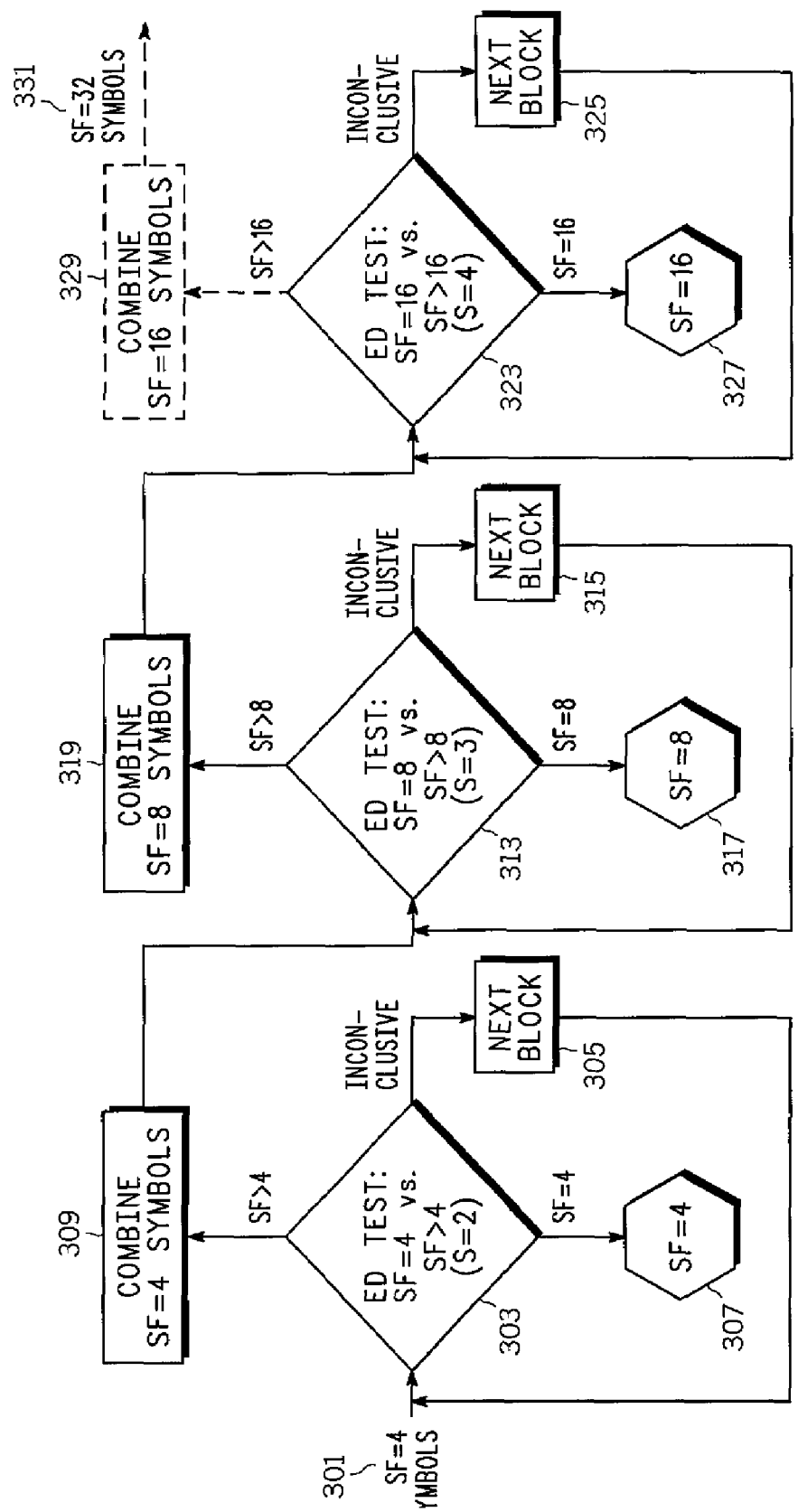
FIG. 3 through FIG. 5 show preferred embodiments of alternative methods of determining a data rate for a variable data rate signal according to the present invention.

Referring to FIG. 3 a method 300 of determining an upper data rate for a variable data rate signal, such as a CDMA signal with variable data rates, will be discussed. This method is preferably implemented within the integrated circuit and receiver reviewed herein above or similar apparatus and the particular processes may be performed via software executing on a processor that is part of the integrated circuit. This method is an application of the energy detection characteristic or statistic and thresholds that were discussed above. In particular the method will be comparing the following characteristic or energy detection statistic:

$\Sigma_{m=1,M} \Sigma_{n=1,\ldots,Num\_Blocks\_Processed} \Sigma_{p=1,\ldots,256/2^s} |S^{(s)}(m,n,p)|^2$ where $S^{(s)}(m,n,p)$ denotes the p'th symbol of the n'th block for the m'th multipath, where $SF = 2^s$ to the thresholds:

1. $K \cdot \sigma^2 (P'/2 + M) + N_\alpha \cdot \text{sqrt}(K \cdot \sigma^4 (p' + M))$, where when the statistic or characteristic exceeds this threshold we rule out the no-signal case which will be referred to as the first threshold below, and 2. $K \cdot \sigma^2 (P+M) - N_\alpha \cdot \text{sqrt}(K \cdot \sigma^4 (2P+M))$, where when the statistic or threshold is less than this threshold we rule out the signal-present case which will be referred to as the second threshold below, where K is the number of partial symbols used at or for a particular test or comparison with the other variables explained above. Also note that the signal power P and noise power $\sigma^2$ will be supplied as parameters from the control channel symbol rate processor.

The method begins at 301 by supplying symbols or specifically partial symbols, preferably, corresponding to the lowest spreading factor, in WCDMA as now proposed this is 4, and the highest data rate. The number of symbols supplied is preferably the equivalent of a block as shown in FIG. 2 or 256 chips or 64 symbols but any other number such as 512 chips will also work. These symbols are supplied to the process at 303 where they are tested to determine whether a characteristic or statistic, specifically the energy detection statistic above, of these partial symbols is consistent with symbols formed from chips at a spread factor of 4 or alternatively a higher spread factor, namely one that is >4. Which of these two tests or comparisons are performed first or whether they are both performed always is largely a matter of design choice. In one embodiment the second comparison is the first one conducted and when that is favorable the first comparison is foregone. With this approach the symbols may be combined in an expeditious manner thereby reducing the data rates as quickly as possible. The discussions below will refer to the first comparison and subsequently the second comparison although no order to these two comparisons is intended.

Generally this process compares a characteristic, such as the energy characteristic that is proportional to an energy, of a first number of first partial symbols constructed from the variable data rate signal to a first threshold to provide a first comparison, the first threshold corresponding to the first number. When the first comparison is favorable, here the characteristic exceeds the first threshold, this confirms that the variable data rate signal includes the first data rate to a predetermined confidence level. Thus the variable data rate signal is a signal at a first data rate that corresponds to the spread factor being tested, here 4, as indicated at 307 and processing of the variable data rate signal at that data rate and spread factor can move forward. If the first comparison is not favorable or optionally regardless of the first results the first number of first partial symbols will also be tested to determine whether the spread factor is larger than that being tested or here SF>4. Generally, this process 303 also compares the characteristic of the first number of the first partial symbols to a second threshold to provide a second comparison, the second threshold also corresponding to the first number. When the second comparison is favorable, here the statistic or characteristic above is less than the second threshold, thus confirming that the variable data rate signal does not include the first data rate to a predetermined confidence level, hence that the spreading factor is greater than the one being tested for or here 4, the process moves to step 309 where combining the first partial symbols to provide second partial symbols, preferably at a spread factor of 8 at a second data rate that is less than said first data rate, preferably ½ the data rate with the spread factor doubled, is undertaken.

The first comparison and the second comparison can both turn out as not favorable, a condition noted as inconclusive in which case the process moves to step 305 and another block of symbols at the present spreading factor is factored into the processes at 303, thereby increasing the first number to a second number of the first partial symbols and then the process of 303 is repeated, specifically the first comparing, the processing, the second comparing, and the combining steps until a favorable comparison is obtained. When the second comparison is favorable and after the combinatorial procedure at step 309 the process moves to step 313 with a second number of second partial symbols, here with a spread factor of 8 and half as many second partial symbols as first partial symbols. Essentially step 313 perform the same processes with the same results as step 303 however here a different data rate and corresponding spread factor are being utilized and considered.

Specifically step 313 first compares a characteristic, preferably the ED statistic above, of a second number of the second partial symbols constructed from the variable data rate signal to a third threshold, equivalent to the first threshold with a different K, to provide a third comparison, the third threshold corresponding to the second number or new K. Processing the variable data rate signal at the second data rate with spread factor 8 317 can be undertaken when the third comparison is favorable. Step 313 second compares the characteristic of the second number of the second partial symbols to a fourth threshold, equivalent to the second threshold above with a different K, to provide a fourth comparison, where thee fourth threshold corresponding to the second number namely new K. When the fourth comparison is favorable, suggesting the spreading factor is greater than 8 combining the second partial symbols to provide third partial symbols at a third data rate that is less than the second data rate is undertaken at step 319 after which the process moves to step 323. As at step 303 the tests or comparisons at 313 may be indeterminate or inconclusive in which case step 315 retrieves another block of chips despread at the present spread factor and the process at 313 is repeated.

In the method of FIG. 3 the first threshold or threshold that determines whether the signal at the spread factor of interest is present, preferably corresponds to an expected mean for the first number of the first partial symbols plus a predetermined number of standard deviations when the variable data rate signal does not include the first data rate so that when the characteristic exceeds the threshold the first comparison is favorable implying or confirming that the first date rate is present with a confidence level corresponding to the predetermined number of the standard deviations. The second threshold corresponds to an expected mean for the first number of the first partial symbols less a predetermined number of standard deviations when the variable data rate signal includes the first data rate so that when the characteristic is less than the threshold the second comparison is favorable implying or confirming that the first date rate is not present with a confidence level corresponding to the predetermined number of the standard deviations.

After step 319, steps 323, 327, 325, and 329 perform analogous procedures to the earlier steps 3132, 317, 315, and 319, respectively, using a spread factor of 16 rather than 8. This process continues these analogous procedures for spread factor 32 symbols 331, as well as spread factor 64, 128 and 256 or until a spread factor and corresponding data rate has been determined. Another perhaps simpler way to describe the process of FIG. 3 is begin at the first decision block 303, where each block (denotes 256 chips), and continue through the flow chart to decision blocks 313 323 doing the requisite tests until you hit a "next block" 305, 315, 325 or a "stop sign" 307, 317, 327. If you reach a "next block", process the next block, update the detection statistic and thresholds, and return to the flow chart at the same decision block. If you reach a "stop sign", then the label indicates the final data rate determination.

Figure 4:
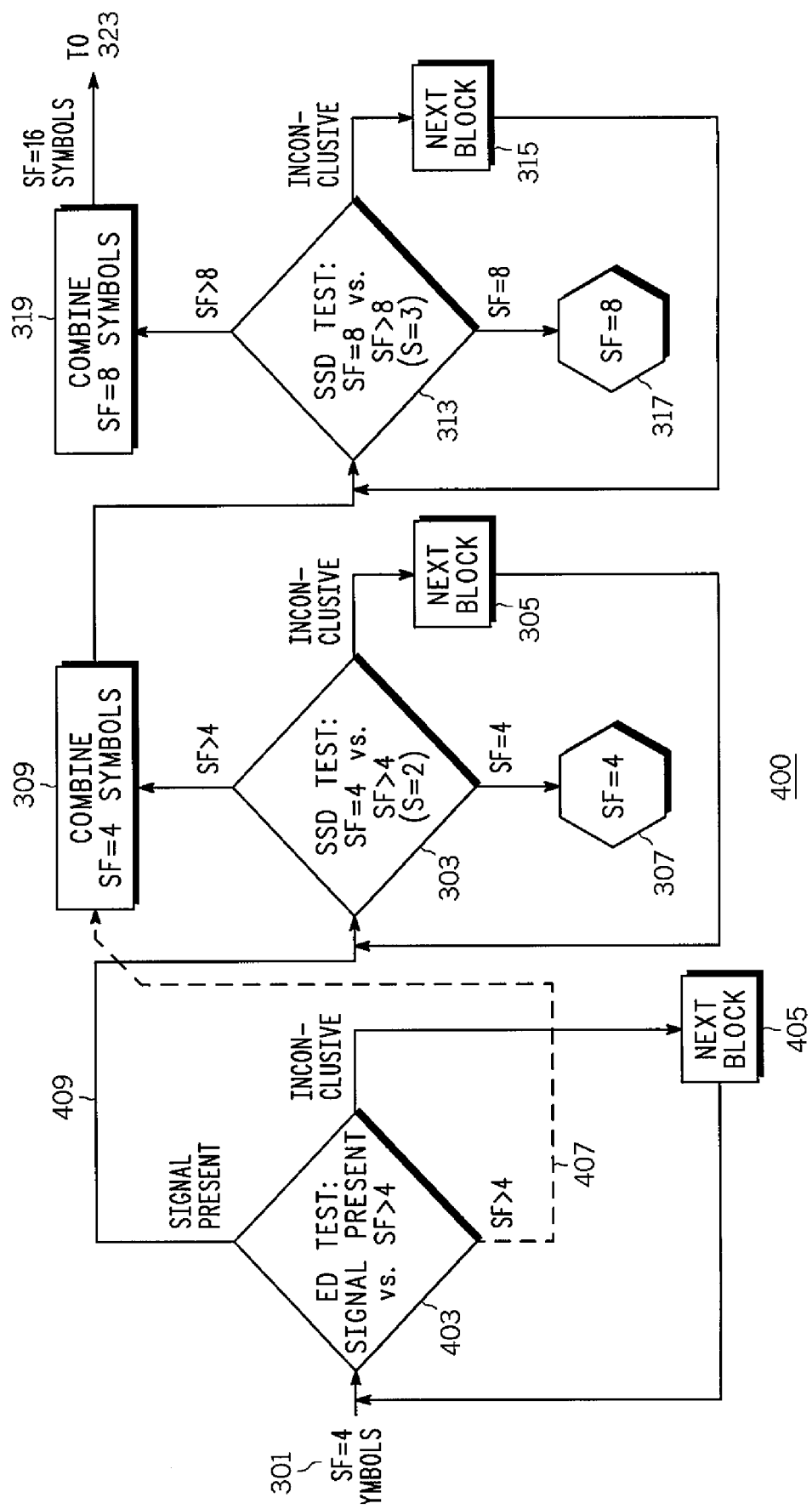

Referring to FIG. 4 a method 400 of determining a data rate or corresponding spreading factor that utilizes a hybrid approach for the characteristics or decision statistic is depicted. The initial test at decision block 403 relies on the Energy Detection (ED) statistic, noted above:

$\Sigma_{m=1\ M}\ \Sigma_{n=1\ \ldots\ Num\_Blocks\_Processed} \Sigma_{p=1\ \ldots\ 256/2^s} |S^{(s)}(m, n,p)|^2$ and the thresholds above to make an initial determination of whether the signal is present at spread factor 4 or greater or optionally whether the spread factor is greater than four 407 with the possibility that the tests will be inconclusive with the first number of partial symbols 301 in which case another block 405 of partial symbols is used and analyzed with the statistic and thresholds being updated. If a signal is determined to be present the process follows 409 to step 303, unless the comparison or test indicates the spread factor is greater than 4 and the optional flow is chosen. Process steps 303 through 323 operate as above explained except that the characteristic used for comparison is a squared linear combination of the partial data symbols or more specifically decision blocks 303, 313 use or rely on a Squared Symbol Difference (SSD) statistic as discussed above:

$$\Sigma_{m=1\ldots M}\Sigma_{n=1}^{Num\_Blocks\_Processed}\Sigma_{p=1\ldots 256/2^{s+1}}|S^{(k)}(m,n,2p)-S^{(s)}(m,n,2p-1)|^2$$

where $S^{(s)}(m,n,p)$ denotes the p'th symbol of the n'th block for the m'th multipath, where $SF=2^s$ and the thresholds are:
1. $K \cdot (P+M) \cdot \sigma^2 + N_\alpha \cdot sqrt\{K \cdot \sigma^4 \cdot (2 \cdot P^2/M + 4 \cdot P + 2M)\}$, where when the statistic or characteristic exceeds this threshold we can rule out the no-signal (or higher spreading-factor) case which will be referred to as the first threshold, and
2. $K \cdot M \cdot \sigma^2 - N_\alpha \cdot sqrt(2 \cdot K \cdot M \cdot \sigma^4)$, where when the statistic or threshold is less than this threshold we rule out the signal-present case which will be referred to as the second threshold.

Figure 5:
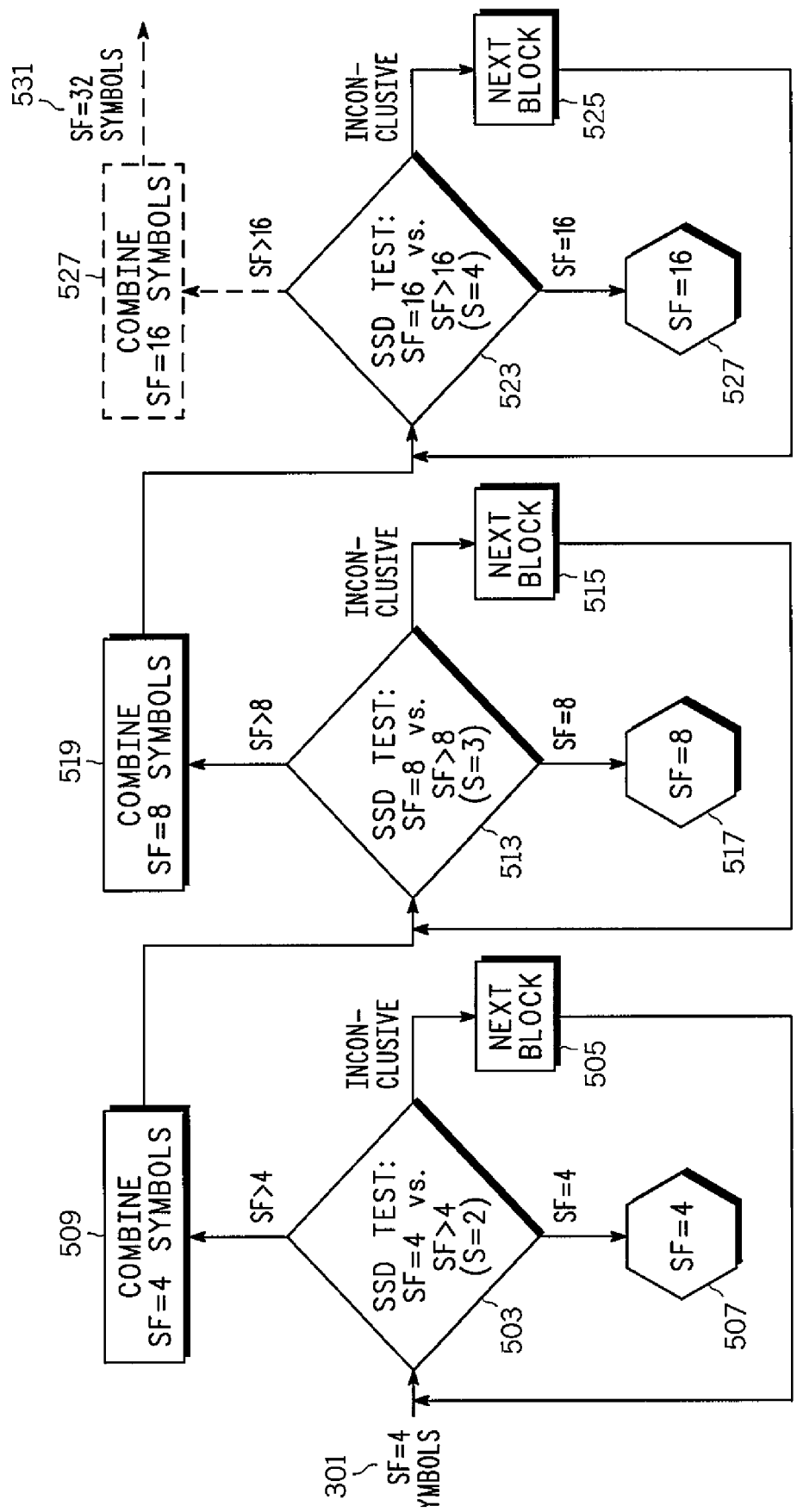

Referring to FIG. 5 a method 500 of determining an unknown data rate for a variable data rate signal is depicted. Note that this method relies completely on the squared symbol difference characteristic and thresholds noted directly above. The steps 503, 505, 507, and 509 operate the same as the steps 303, 305, 307, and 309 as discussed above with reference to FIG. 3 except that the characteristic used or compared in step 503 is the SSD characteristic as calculated herein above and this is compared to the thresholds above. Steps 513 through 531 are similarly identical to 313 through 331 discussed above in addition to the steps of the procedure not depicted for even higher spreading factors. In each of the methods it should be noted that as the process moves from one decision block to the next the amount of data that is passed on to the data symbol processor is cut in half. Further more once the process moves to the next block the data at the lower spreading factor no longer needs to be queued. Although not depicted a similar method using channel estimates and the corresponding statistics and thresholds discussed above is also a possible implementation according to the principles and concepts herein discussed.

Simulations of the above 3 methods have shown a dramatic reduction in data quantities using the above algorithms. The hybrid algorithm of FIG. 4 appears to provide more accurate data rate determinations at higher spreading factors or lower data rates as well as better no signal detection than the ED or SSD method alone. Given the nature of the traffic that is likely on these future packet data based system, namely the bursty nature of this traffic it is expected that most packets will be at relatively low data rates with an occasional packet at a high data rate. Thus it is also clear that the present invention provides a much needed improvement in the data rate determination and hence average bandwidths that must be planned for.

The methods and apparatus, discussed above, and the inventive principles and concepts thereof are intended to and will alleviate problems caused by prior art blind data rate determination processes. Using the principles of discussed, disclosed and described herein promises to dramatically reduce bandwidth requirements for variable data rate receivers and thus costs and complexities thereof This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method of determining an upper data rate for a variable data rate signal, the method including the steps of:
   first comparing a characteristic of a first number of first partial symbols constucted from the variable data rate signal to a first threshold to provide a first comparison, said first threshold corresponding to said first number, said first number less than all first partial symbols in a frame;
   processing the variable data rate signal at a first data rate when said first comparison is favorable;
   second comparing said characteristic of said first number of said first partial symbols to a second threshold to provide a second comparison, said second threshold corresponding to said first number; and
   combining said first partial symbols to provide second partial symbols at a second data rate that is less than said first data rate when said second comparison is favorable.

2. The method of claim 1 further including, when said first comparison and said second comparison are not favorable, a step of increasing said first number to a second number of said first partial symbols and repeating said first comparing, said processing, said second comparing, and said combining steps.

3. The method of claim 1 further including, when said second comparison is favorable, repeating the steps of claim 1 as follows:
   first comparing a characteristic of a second number of said second partial symbols constructed from the variable data rate signal to a third threshold to provide a third comparison, said third threshold corresponding to said second number;
   processing the variable data rate signal at said second data rate when said third comparison is favorable;
   second comparing said characteristic of said second number of said second partial symbols to a fourth threshold to provide a fourth comparison, said fourth threshold corresponding to said second number; and
   combining said second partial symbols to provide third partial symbols at a third data rate that is less than said second data rate when said fourth comparison is favorable.

4. The method of claim 1 wherein said first comparing said characteristic further includes comparing a characteristic that is proportional to an energy of said first number of said first partial symbols.

5. The method of claim 1 wherein said first comparing said characteristic to said first threshold further includes comparing said characteristic to a threshold that confirms that the variable data rate signal includes said first data rate to a predetermined confidence level.

6. The method of claim 5 wherein said threshold corresponds to an expected mean for said first number of said first partial symbols plus a predetermined number of standard deviations when the variable data rate signal does not include said first data rate so that when said characteristic exceeds said threshold said first comparison is favorable implying said first data rate is present wit a confidence level corresponding to said predetermined number of said standard deviations.

7. The method of claim 1 wherein said second comparing said characteristic to said second threshold further includes comparing said characteristic to a threshold that confirms that the variable data rate signal does not include said first data rate to a predetermined confidence level.

8. The method of claim 7 wherein said threshold corresponds to an expected mean for said first number of said first partial symbols less a predetermined number of standard deviations when the variable data rate signal includes said first data rate so that when said characteristic is less than said threshold said second comparison is favorable implying said first date data is not present with a confidence level corresponding to said predetermined number of said standard deviations.

9. The method of claim 1 wherein said first comparing said characteristic further includes comparing a characteristic that is proportional to one of a sum of squared linear combinations of said first number of said first partial symbols and a channel estimate corresponding to said first number of said first partial symbols.

10. The method of claim 1 wherein the variable data rate signal is a Code Division Multiple Access signal having variable data rates.

11. The method of claim 1 wherein said first data rate is the highest possible data rate for the variable data rate signal.

12. An integrated circuit arranged and constructed to determine an upper data rate for a variable data rate signal, the integrated circuit comprising in combination:
a buffer for queuing a first number of first partial symbols constructed from the variable data rate signal;
a comparator for first comparing a characteristic of said first number of said first partial symbols to a first threshold to provide a first comparison, said first threshold corresponding to said first number, said first number less than all first partial symbols in a frame, said comparator further for second comparing said characteristic of said first number of said first partial symbols to a second threshold to provide a second comparison, said second threshold corresponding to said first number;
said buffer providing the first partial symbols as symbols for further processing the variable data rate signal at a first data rate when said first comparison is favorable; and
a combiner for combining said first partial symbols to provide second partial symbols at a second data rate that is less than said first data rate when said second comparison is favorable.

13. The integrated circuit of claim 12 further including a calculator, coupled to the buffer and the comparator, for computing said characteristic and said first threshold and said second threshold.

14. The integrated circuit of claim 13 further including a controller coupled to the comparator for controlling said calculator, said combiner, said buffer, and a despreader such that the integrated circuit determines the upper data rate.

15. The integrated circuit of claim 14 wherein said despreader and said buffer, when said first comparison and said second comparison are not favorable, operate to increase said first number to a second number of said first partial symbols and said calculator, said comparator, and said combiner repeat said computing, said first comparing, said second comparing, said providing, and said combining operations.

16. The integrated circuit of claim 14 further including, when said second comparison is favorable, repeating the operations of claim 14 under control of the controller as follows:
said calculator computing a characteristic of a second number of said second partial symbols constructed from the variable data rate signal and a third threshold and a fourth threshold, each corresponding to said second number;
said comparator comparing said characteristic to said third threshold to provide a third comparison and said comparator further comparing said characteristic to said fourth threshold to provide a fourth comparison;
said buffer providing said second partial symbols as symbols for further processing the variable data rate signal at said second data rate when said third comparison is favorable; and
said combiner combining said second partial symbols to provide third partial symbols at a third data rate that is less than said second data rate when said fourth comparison is favorable.

17. The integrated circuit of claim 12 wherein said comparator comparing said characteristic further includes comparing a characteristic that is proportional to an energy of said first number of said first partial symbols.

18. The integrated circuit of claim 12 wherein said comparator first comparing said characteristic to said first threshold further includes comparing said characteristic to a threshold that confirms that the variable data rate signal includes said first data rate to a predetermined confidence level.

19. The integrated circuit of claim 18 wherein said threshold corresponds to an expected mean for said first number of said first partial symbols plus a predetermined number of standard deviations when the variable data rate signal does not include said first data rate so that when said characteristic exceeds said threshold said first comparison is favorable implying said first data rate is present with a confidence level corresponding to said predetermined number of said standard deviations.

20. The integrated circuit of claim 12 wherein said comparator second comparing said characteristic to said second threshold further includes comparing said characteristic to a threshold that confirms that the variable data rate signal does not include said first data rate to a predetermined confidence level.

21. The integrated circuit of claim 20 wherein said threshold corresponds to an expected mean for said first number of said fast partial symbols less a predetermined number of standard deviations when the variable data rate signal includes said first data rate so that when said characteristic is less than said threshold said second comparison is favorable implying said first date data rate is not present with a confidence level corresponding to said predetermined number of said standard deviations.

22. The integrated circuit of claim 12 wherein said first comparing said characteristic further includes comparing a characteristic that is proportional to one of a sum of squared linear combinations of said first number of said first partial symbols and a channel estimate corresponding to said first number of said first partial symbols.

23. The integrated circuit of claim 12 wherein the variable data rate signal is a Code Division Multiple Access signal having variable data rates.

24. The integrated circuit of claim 12 wherein said first data rate is the highest possible data rate for the variable data rate signal.

25. A receiver arranged and constructed to determine an upper data rate for a variable data rate signal, the receiver comprising in combination:
   a front end for down converting a radio frequency signal to a base band signal with an unknown data rate;
   a buffer for queuing a first number of first partial symbols constructed from the variable data rate signal, said first number less than all first partial symbols in a frame;
   a comparator for first comparing a characteristic of said first number of said first partial symbols to a first threshold to provide a first comparison, said first threshold corresponding to said first number, said comparator further for second comparing said characteristic of said first number of said first partial symbols to a second threshold to provide a second comparison, said second threshold corresponding to said first number;
   said buffer providing the first partial symbols as symbols for further processing the variable data rate signal at a first data rate when said first comparison is favorable; and
   a combiner for combining said first partial symbols to provide second partial symbols at a second data rate that is less than said first data rate when said second comparison is favorable.

26. The receiver of claim 25 further including a calculator, coupled to the buffer and the comparator, for computing said characteristic and said first threshold and said second threshold.

27. The receiver of claim 26 further including a controller coupled to the comparator for controlling said calculator, said combiner, said buffer, and a despreader such that the receiver determines the upper data rate.

28. The receiver of claim 27 wherein said despreader and said buffer, when said first comparison and said second comparison are not favorable, operate to increase said first number to a second number of said first partial symbols and said calculator, said comparator, and said combiner repeat said computing, said first comparing, said second comparing, said providing, and said combining operations.

29. A software program that when installed and operating on a programmable integrated circuit will result in the integrated circuit facilitating determination of an upper data rate for a variable data rate signal, the program including instructions that perform a method including the following steps:
   first comparing a characteristic of a first number of first partial symbols constructed from the variable data rate signal to a first threshold to provide a first comparison, said first threshold corresponding to said first number, said first number less than all first partial symbols in a frame;
   processing the variable data rate signal at a first data rate when said first comparison is favorable;
   second comparing said characteristic of said first number of said first partial symbols to a second threshold to provide a second comparison, said second threshold corresponding to said first number; and
   combining said first partial symbols to provide second partial symbols at a second data rate that is less than said first data rate when said second comparison is favorable.

30. The software program of claim 29 wherein the method further includes, when said first comparison and said second comparison are not favorable, a step of increasing said first number to a second number of said first partial symbols and repeating said first comparing, said processing, said second comparing, and said combining steps until a data rate for the variable data rate signal has been determined.

* * * * *

UNITED STATES PATENT AND TRADEMARK OFFICE
CERTIFICATE OF CORRECTION

PATENT NO. : 7,006,439 B2
DATED : February 28, 2006
INVENTOR(S) : Thron et al.

It is certified that error appears in the above-identified patent and that said Letters Patent is hereby corrected as shown below:

Column 17,
Line 30, delete "wit" and insert -- with --.

Column 19,
Line 2, delete "date".

Signed and Sealed this

Twenty-third Day of May, 2006

JON W. DUDAS
*Director of the United States Patent and Trademark Office*